Figure 1:
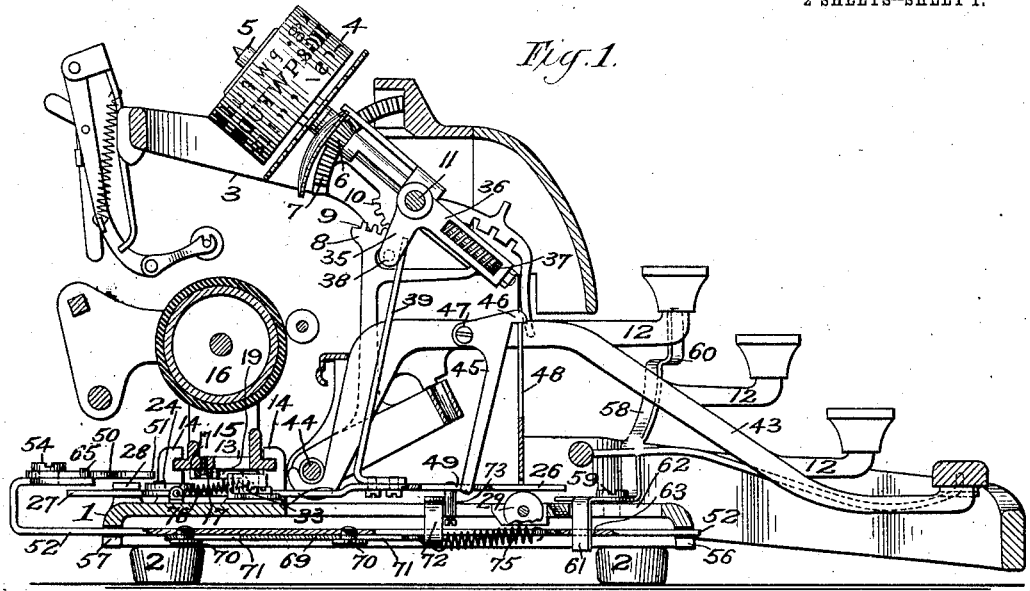

G. C. BLICKENSDERFER.
TYPE WRITING MACHINE.
APPLICATION FILED APR. 10, 1908.

972,152.

Patented Oct. 11, 1910.

2 SHEETS—SHEET 1.

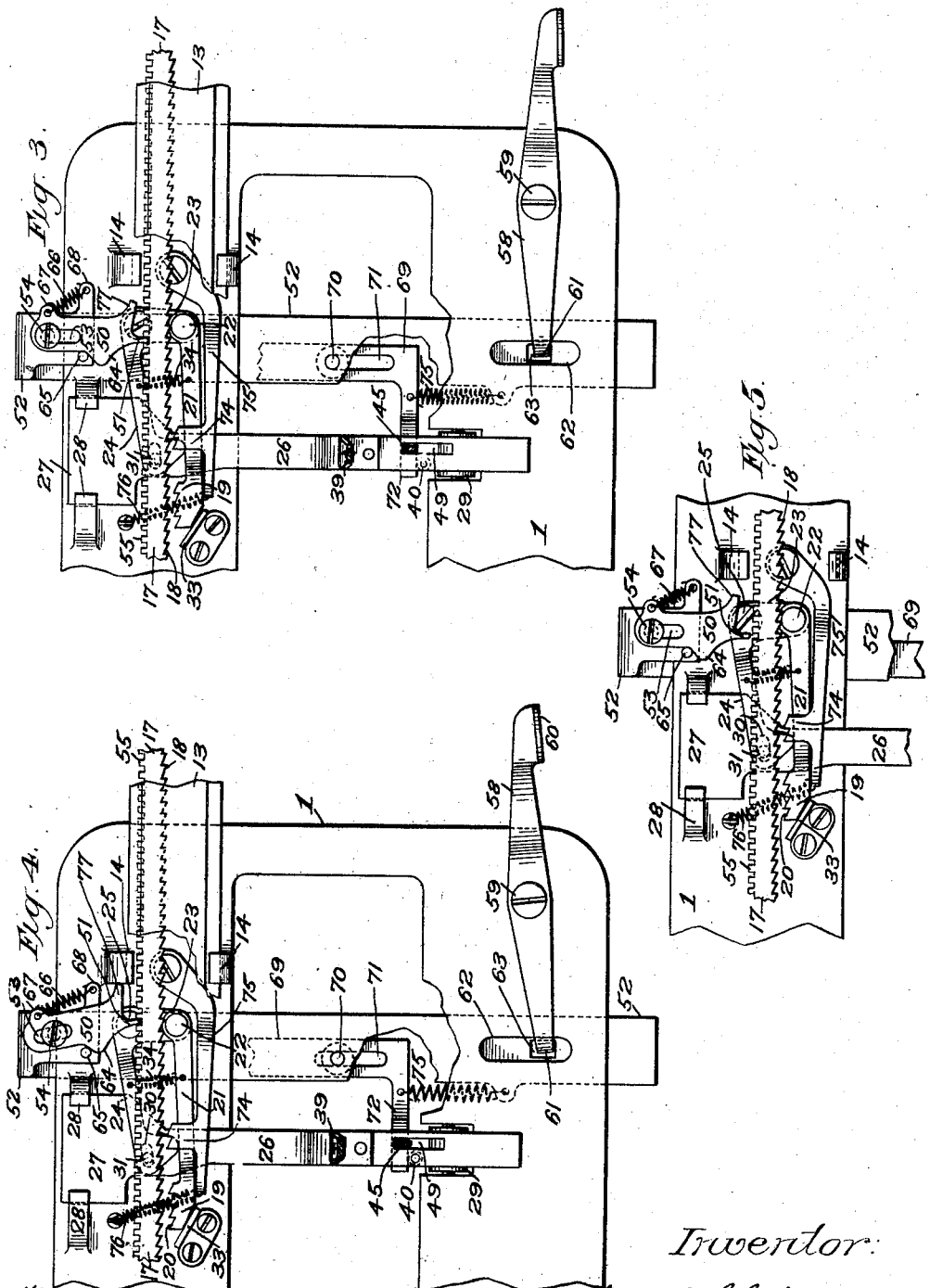

UNITED STATES PATENT OFFICE.

GEORGE C. BLICKENSDERFER, OF STAMFORD, CONNECTICUT.

TYPE-WRITING MACHINE.

972,152.
Specification of Letters Patent. Patented Oct. 11, 1910.
Application filed April 10, 1908. Serial No. 426,293.

*To all whom it may concern:*

Be it known that I, GEORGE C. BLICKENS-DERFER, a citizen of the United States, residing at Stamford, county of Fairfield, and State of Connecticut, have invented certain new and useful Improvements in Type-Writing Machines, fully described and represented in the following specification and the accompanying drawings, forming a part of the same.

This invention relates to certain improvements in carriage controlling mechanism for typewriting machines.

Typewriting machines have been heretofore provided with devices by which the carriage may be jumped or stepped backward, that is, in a direction opposite to that in which it is moved by the ordinary step-by-step feed, for a space or certain number of spaces, the usual purpose of such devices being to facilitate the positioning of the carriage in making corrections. Such devices have, however, usually been applied to typewriting machines which depend for their step-by-step feeding movement on the action of an escapement, that is to say, the carriage is continually under the stress of an advancing spring which effects the feed of the carriage step-by-step through the operation of suitable escapement mechanism.

The object of the present invention is to produce an improved mechanism for giving the carriage a limited movement in a direction opposite to that effected by the step-by-step advancing devices, which is applicable to machines in which the feed of the carriage is produced by a positively operated feeding device which is thrown into and out of operation to effect the feed as distinguished from an escapement mechanism.

A further object of the invention is to produce a new and improved mechanism for giving the carriage a limited movement in a direction opposite to that produced by the step-by-step advancing devices, said mechanism coöperating with the advancing devices to position the carriage as desired.

A further object of the invention is to produce a device which, while primarily intended to give the carriage a limited movement in a direction opposite to that produced by the step-by-step advancing devices, may also, through other suitable connections with said devices, be operated to feed the carriage in either direction.

The invention extends to certain details of construction by which the various devices employed may be simply and effectively operated.

With these and other objects in view the invention consists in certain constructions and in certain parts, improvements, and combinations, as will be hereinafter fully described and then specifically pointed out in the claims hereunto appended.

Figure 2:
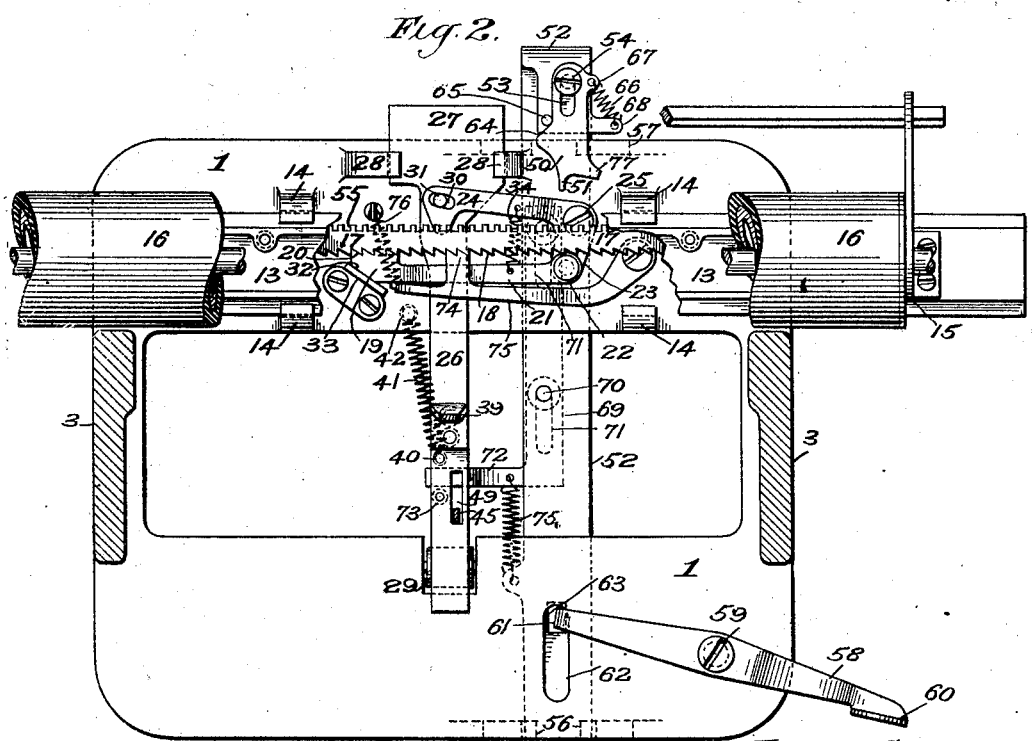

Referring to the drawings—Figure 1 is a sectional elevation of one form of typewriting machine embodying the invention; Fig. 2 is a plan of the feeding mechanism illustrated in Fig. 1, the paper carriage being broken away; Fig. 3 is a detail view of the feeding mechanism shown in Fig. 2, but showing the parts in different position; Fig. 4 is a view similar to Fig. 3, but showing the parts in a still different position; and Fig. 5 is a detail view illustrating the position of the parts of the feeding mechanism in a position intermediate the positions shown in Figs. 2 and 3.

The typewriting machine illustrated in the drawing, and which has been selected to illustrate one embodiment of the invention, is a machine of the well-known Blickensderfer type. It is to be understood, however, that the machine is not to be confined to machines of this type, but may be embodied in machines differing widely from this type.

In the particular machine illustrated, there is provided a base 1 mounted on feet 2, the said base serving to support a frame 3 in which the operative parts of the machine are mounted.

In the particular machine illustrated, the type mechanism, as is characteristic of the Blickensderfer machine, consists of a wheel 4 secured to a shaft 5 in any suitable manner. This shaft 5 is provided with a gear 6 meshing with two racks, one of which, marked 7, is illustrated. The movements of these racks are produced from two sectors, one of which is indicated at 8, this sector being provided with teeth 9 which mesh with the teeth on segments 10 formed on the arms which carry the racks. The shaft 5 passes through a rock shaft 11 suitably supported in the frame, and the proper movements of the type mechanism are produced from key levers 12, the depression of each key lever causing movement of the rock shaft 11. The detail construction of this type mechanism and its operation has no bearing on the present invention, and it will therefore not be fully described, but reference is made to Patent No. 583,840, granted to George C. Blickensderfer June 1st, 1897, in which its construction and method of operation are fully described.

The carriage of the machine may be of any suitable construction. In the particular machine illustrated, it consists of a sliding plate 13, the movement of which is controlled by guides 14 mounted on the bed plate 1. The carriage is provided with the usual standards, one of which is indicated at 15. These standards serve to support the usual paper roll 16. The step-by-step feeding mechanism, by which the carriage is advanced, may be varied in construction, but it will include suitable engaging devices which are brought into engagement to effect the feed, the carriage being free from any stress of the feeding devices, that is to say, not being under the influence of any mechanism which tends to give it a movement except when these engaging devices are in engagement. In the machine illustrated, these engaging devices include a rack bar 17 provided with teeth 18, this bar being secured to the carriage in any suitable manner. The coöperating feeding devices in the particular machine illustrated comprises a feeder, as 19, this device being provided with teeth 20 which engage the teeth 18 on the bar 17. Suitable means will be provided by which the feeder is caused to be engaged with and disengaged from the coöperating engaging means on the carriage. The particular construction of these means may be varied, and will be varied according to the type of feeder and coöperating devices employed. In the particular construction illustrated, the feeder is formed in one piece, with an arm 21, this arm being pivoted at 22 to one of the arms 23 of a bell crank lever 23, 24, this bell crank lever being pivoted at 25 to the base of the machine. This bell crank lever, in the particular machine illustrated, is operated from a slide 26. This slide is, as shown, provided with an enlarged head 27 working between guides 28 formed on the bed plate of the machine. The end of the slide opposite the head may, to reduce friction, be supported on a friction roll 29 pivoted in the bed plate of the machine. The connection between the bell crank levers 23, 24 and the slide may be effected, as illustrated, by providing the arm 24 of the bell crank with a slot as 30, the slide having a pin 31 which engages the slot. The end of the feeder in the particular construction illustrated, is provided with a beveled surface 32 which coöperates with a guide-block 33 suitably secured to the base of the machine. The arm 24 of the bell crank and the arm 21 carrying the feeder block may be connected by a light spring, as 34.

With the construction as so far described, it will be understood that as the slide 26 is moved in one direction, the bell crank lever 23, 24 is rocked and the feeder block is drawn out of engagement with the teeth 18 on the rack 17, and at the same time the block is drawn back, the positions of the parts being indicated, for instance, in Fig. 4. If the slide is moved in the opposite direction, the feeder block will be caused to engage with the teeth on the rack and thus advance the carriage. It will be noted, however, that during the time when the feeder block is out of engagement with the rack, the carriage is entirely relieved from the action of the feeding devices. The means for operating the feeder actuating slide, when this form of actuating mechanism is employed, may be widely varied. In the particular construction illustrated, there is loosely mounted on the shaft 11 a bell crank lever 35, 36, the arm 36 being slotted and being engaged by a pin 37 on the shaft 5 which, as before pointed out, carries the type-wheel 4. Each time, therefore, a key is depressed to operate the type-wheel this bell crank lever 35, 36 will be rocked. The arm 35 of this bell crank lever carries a pin 38 which engages an upstanding arm 39 carried on the actuator slide 26. This actuator slide has secured to its underside a pin 40 to which is secured a spring 41, the other end of this spring being secured to a pin 42 on the bed plate. Each time a key is depressed, therefore, the spring 41 is placed under operating tension so that when a key is depressed and released the actuator slide will be given a complete reciprocation.

As will be readily understood, the actuator feed slide will be arranged so as to be operated from the spacing mechanism as well as from the type operating mechanism. In the particular machine illustrated, the spacer consists of a lever 43 which is hooked around a rod 44, this spacer, as well as the type levers, being held in position by certain springs not shown, the construction, however, being fully shown and described in Patent No. 583,840, before referred to. As illustrated, this spacer carries a two-armed lever 45, 46, this two-armed lever being pivoted at 47 to the spacer 43. The arm 46 of this two-armed lever hooks over the plate 48 on the front of the machine, and the arm 45 engages a slot 49 in the actuator slide 26.

The construction by which the movement of the carriage, in a direction opposite to that produced by the step-by-step mechanism, is effected, may be widely varied. In the embodiment of the invention which is being described, this mechanism includes a retractor. While this retractor may be variously constructed, mounted and operated, in the particular machine shown it includes a retractor plate 50 provided with an operating tooth 51. This retractor plate in the particular machine illustrated is operated from an actuator comprising a slide 52, the connection between the retractor and its actuator slide being effected by providing the actuator with a slot 53 through which passes a pin 54, this pin being secured to the actuator slide. By this construction the retractor plate has both a swinging and sliding connection with the actuator slide.

The carriage is provided in the particular machine illustrated with means which may be engaged by the retractor so as to give it the backward movement as illustrated, this means consisting of teeth 55 formed on the bar 17, before referred to.

The retractor actuating slide, when the same is employed, may be mounted in any suitable manner. As shown, it is supported in guides 56, 57 formed on the underside of the bed plate 1, the end of the slide which carries the retractor plate being bent upward, as clearly shown in Fig. 1.

Any suitable means may be employed for operating this retractor actuating slide. In the construction illustrated, there is employed a key lever 58 pivoted at 59 to the bed plate of the machine, the operating end of the lever being formed with a thumbpiece 60, as shown. The other end of the lever is bent downward, as indicated at 61 (see Fig. 1) and extends through a slot 62 formed in the bed plate and into a slot 63 formed in the actuator slide.

The particular construction illustrated is of such a character that the retractor is first brought into engaging position by movement of the slide 52, it being thereafter operated by the continued movement of the slide to give the carriage its backward movement. The means by which this movement of the retractor plate is effected may be widely varied. As shown the plate is provided with a cam surface 64 which is engaged by a pin 65 on the retractor slide. A returning spring as 66 (see Fig. 2) may be employed, this spring being connected to an ear 67 formed on the retractor and to an arm 68 extending from the retractor operating slide. In the particular machine illustrated, the means by which the step-by-step advancing movement of the carriage is effected should be disengaged so as to permit the retractor to effect the backward movement of the carriage before the retractor starts to move the carriage. While this may be effected in various ways, in the particular construction illustrated the retractor operating slide has secured to its underside a plate 69, the attachment being effected by screws 70 or in any other suitable manner. These screws 70 pass through slots 71 in the plate 69, so that the actuator slide may have a sliding movement with respect to the plate.

This plate 69 is provided with a finger 72, which coöperates with a pin 73 depending from the feeder operating slide 26. The plate 69 may be further connected to the actuator slide by means of a suitable spring, as 73.

To prevent any rebounding of the carriage after the feeding devices have operated, a suitable locking pawl 74 may be provided, and this pawl may be carried on an arm 75 pivoted to the bed plate of the machine, the other end of the arm being also connected to the bed plate and by spring 76 (see Fig. 2).

The amount of backward movement given the carriage by the retractor may be determined in any suitable manner. As shown, the retractor plate is formed with a projection 77, this projection being arranged, when the retractor has reached its rearmost position, to strike against one of the guides 14 before mentioned and prevent its further movement.

With the construction as described, if it be desired to operate the retractor, and assuming the parts to be in the position shown in Fig. 2, the retractor slide operating key is thrown over, thus causing the retractor slide to be moved until the tooth 51 on the retractor plate engages between two of the teeth 55 on the carriage rack. This position of the parts is well illustrated in Fig. 3. As the parts move into the position shown in Fig. 3, the finger 72 on the plate 69, coöperating with the pin 73 on the feed operating slide 26, moves this slide back, thus rocking the bell crank lever 23, 24 and disengaging the feeder from the rack, the locking pawl 74 being also moved out of locking position by the same movement, for the reason that the end of the arm 75 lies behind the arm which carries the feeder block 19. A further movement of the actuator slide 52 causes the pin 65 to coöperate with the cam surface 64 on the retractor plate, thus swinging the plate from the position shown in Fig. 3 to that shown in Fig. 4, and at the same time moving the carriage back. This movement of the carriage is, in the particular mechanism shown, equal to two spaces, that is, it is twice the amount of movement of the carriage produced by the feeder block when it advances the carriage. Pressure being now removed from the key which operates the actuator slide, this slide returns to its normal position, and at the same time the slide 26 moves back, throwing the feeder into engagement with the rack on the carriage and causing the carriage to be advanced one space. Since, however, the retractor moves the carriage back two spaces, the result of the entire operation will be that the carriage will have been moved back one space from the position it occupied when the retractor mechanism was operated.

If desired, the carriage may be moved forward as well as backward by the retractor mechanism. This may be accomplished by actuating the retractor slide in such a way that it receives less than its full movement, the movement being sufficient, however, to actuate the feed operating slide 26. The position which the parts, when thus operated, give the retractor slide, is illustrated in Fig. 5. By reference to this figure it will be seen that while the retractor slide has been moved a certain distance, it has not been moved far enough to bring the retractor tooth into engagement with its coöperating teeth on the bar 17. When, therefore, the retractor slide is released, the feed slide will again advance, causing the feeder to engage with the rack on the carriage and advance the carriage one space.

Changes and variations may be made in the construction by which the invention is carried into effect. The invention is not, therefore, to be limited to the specific construction set forth and illustrated in the accompanying drawings.

What is claimed is:—

1. In a typewriting machine, the combination with a carriage, of means for giving it a step by step advancing movement, a carriage retractor, and means for disengaging the carriage from the action of the advancing devices when the retractor is operated to move the carriage backward.

2. In a typewriting machine, the combination with a carriage, of means for giving the carriage a step by step advancing movement, said means including suitable engaging devices, a carriage retractor, and connections whereby when the retractor is operated the engaging devices are disengaged.

3. In a typewriting machine, the combination with a carriage, of means for giving the carriage a step by step advancing movement, said means including engaging members, one of which is mounted on the carriage, an actuator for said feeding device, a carriage retractor, an actuator therefor, and connections between the actuators whereby an operation of the retractor actuator effects the operation of the other actuator.

4. In a typewriting machine, the combination with a carriage having a rack, of a feeder, actuating means for causing the feeder to engage the rack and advance the carriage, a carriage retractor, an actuator therefor, and connections between the actuator and the actuating means.

5. In a typewriting machine, the combination with a carriage having step by step advancing devices, a retractor, actuating means for the retractor, said means including a key, and connections between the retractor actuating means and the advancing devices whereby the operation of the retractor key the carriage may be fed either forward or backward.

6. In a typewriting machine, the combination with a carriage having a rack, of a feeder, actuating means for the feeder, a carriage retractor, an operating slide therefor, and connections between the feeder actuating means and the slide.

7. In a typewriting machine, the combination with a carriage, of a retractor, an actuator slide on which the retractor is mounted, a coöperating retracting means mounted on the carriage, connections between the retractor and the slide whereby the slide may have a continued movement with relation to the retractor after the retractor has engaged the means on the carriage, and devices mounted on the slide whereby the continued movement of the slide effects the movement of the retractor.

8. In a typewriting machine, the combination with a carriage, of retracting means mounted thereon, a retractor, an operating slide on which the retractor is mounted, a slip connection between the actuator slide and the retractor, and means on the slide operating to give the retractor a movement after it has been caused to engage with the retracting means on the carriage.

9. In a typewriting machine, the combination with a carriage, of step by step advancing means therefor, a retractor, connections from the retractor to the advancing means whereby the advancing means are thrown into operation to advance the carriage for a distance less than that which it has been moved by the retractor, and operating means for the retractor.

10. In a typewriting machine, the combination with a carriage having a rack, of a feeder, actuating means for the feeder including a slide whereby the feeder is disengaged from, engaged with and caused to advance the carriage, a carriage retractor, actuating means therefor, including a slide and key, and connections between the two slides.

11. In a typewriting machine, the combination with a carriage having a rack, of a feeder, means for operating the feeder to cause it to engage with the rack, advance the carriage and be disengaged therefrom, means on the carriage with which the retractor engages, operating means for the retractor including a slide with which the retractor has a pivoted and sliding connection, means carried by the slide for turning the retractor on its pivot, and connections between the retractor operating means and the feeder operating means.

12. In a typewriting machine, the combination with a carriage having a rack, of a feeder, an actuator slide therefor, a retractor, an actuator slide therefor, a pivoted and sliding connection between the retractor and its slide, means including a cam whereby the movement of the retractor slide swings the retractor on its pivot, a key for operating the retractor slide, and connections between the slides.

In testimony whereof, I have hereunto set my hand, in the presence of two subscribing witnesses.

GEORGE C. BLICKENSDERFER.

Witnesses:
JAMES Q. RICE,
A. WHITE.